(12) United States Patent
Cline et al.

(10) Patent No.: US 8,060,348 B2
(45) Date of Patent: *Nov. 15, 2011

(54) SYSTEMS FOR ANALYZING TISSUE SAMPLES

(75) Inventors: Harvey Ellis Cline, Schenectady, NY (US); Ali Can, Troy, NY (US); Xiaodong Tao, Niskayuna, NY (US); Robert John Filkins, Niskayuna, NY (US); Maximilian Lewis Seel, Albany, NY (US); Michael Christopher Montalto, Albany, NY (US)

(73) Assignee: General Electric Company, Niskayuna, NY (US)

( * ) Notice: Subject to any disclaimer, the term of this patent is extended or adjusted under 35 U.S.C. 154(b) by 545 days.

This patent is subject to a terminal disclaimer.

(21) Appl. No.: 11/606,582

(22) Filed: Nov. 30, 2006

(65) Prior Publication Data

US 2008/0033657 A1 Feb. 7, 2008

Related U.S. Application Data

(63) Continuation-in-part of application No. 11/500,028, filed on Aug. 7, 2006.

(51) Int. Cl.
*G06F 17/10* (2006.01)

(52) U.S. Cl. .......... 703/2; 702/19; 702/23; 702/32; 436/64; 382/128; 382/278

(58) Field of Classification Search .................. None
See application file for complete search history.

(56) References Cited

U.S. PATENT DOCUMENTS

| | | | |
|---|---|---|---|
| 5,888,743 A | 3/1999 | Das | |
| 5,995,645 A | 11/1999 | Soenksen et al. | |
| 6,150,173 A | 11/2000 | Schubert | |
| 6,160,617 A | 12/2000 | Yang | |
| 6,195,451 B1 | 2/2001 | Kerschmann et al. | |
| 6,573,043 B1 | 6/2003 | Cohen et al. | |
| 6,788,816 B1 | 9/2004 | Kiyuna | |
| 6,995,020 B2 | 2/2006 | Capiodieci et al. | |
| 7,219,016 B2 | 5/2007 | Rimm et al. | |
| 7,321,881 B2 | 1/2008 | Saidi et al. | |
| 7,467,119 B2 | 12/2008 | Saidi et al. | |
| 7,483,554 B2 | 1/2009 | Kotsianti et al. | |
| 7,505,948 B2 | 3/2009 | Saidi et al. | |
| 7,709,222 B2 | 5/2010 | Rimm et al. | |
| 2002/0076092 A1 | 6/2002 | Ellis et al. | |
| 2002/0164063 A1 | 11/2002 | Heckman | |
| 2002/0177149 A1 | 11/2002 | Rimm et al. | |
| 2002/0187487 A1 | 12/2002 | Goldenring et al. | |
| 2003/0036855 A1 | 2/2003 | Harris et al. | |
| 2003/0077675 A1 | 4/2003 | Das | |
| 2003/0184730 A1 | 10/2003 | Price | |
| 2004/0023320 A1 | 2/2004 | Steiner et al. | |
| 2004/0197839 A1 | 10/2004 | Daniely et al. | |
| 2004/0248325 A1 | 12/2004 | Bukusoglul | |
| 2005/0267690 A1 | 12/2005 | Cong et al. | |
| 2006/0094868 A1 | 5/2006 | Giuliano et al. | |
| 2007/0016373 A1 | 1/2007 | Hunter et al. | |
| 2007/0099219 A1 | 5/2007 | Teverovskiy et al. | |
| 2007/0111251 A1* | 5/2007 | Rosania et al. ............... | 435/7.1 |
| 2008/0118916 A1 | 5/2008 | Sood et al. | |
| 2008/0118934 A1 | 5/2008 | Gerdes et al. | |
| 2008/0118944 A1 | 5/2008 | Larsen et al. | |
| 2008/0144895 A1 | 6/2008 | Hunter et al. | |
| 2010/0062452 A1* | 3/2010 | Gustavson et al. ........... | 435/7.1 |

FOREIGN PATENT DOCUMENTS

| | | |
|---|---|---|
| EP | 0345953 B1 | 7/1994 |
| EP | 1416278 B1 | 11/2004 |
| WO | 02086498 A2 | 10/2002 |
| WO | WO2004038418 A1 | 5/2004 |
| WO | WO2006016697 A1 | 2/2006 |
| WO | 2007130677 A2 | 11/2007 |
| WO | WO 2007/136724 * | 11/2007 |
| WO | 2008064067 A2 | 5/2008 |
| WO | 2008133727 A2 | 11/2008 |
| WO | 2008133728 A2 | 11/2008 |
| WO | 2008133729 A2 | 11/2008 |

OTHER PUBLICATIONS

Anderson et al., "Subcellular distribution of Wnt pathway proteins in normal and neoplastic colon", 2002, PNAS, vol. 99, No. 13, pp. 8683-8688.*

T Hothorn and B. Lausen, "On the exact distribution of maximally selected rank statistics", Computational Statistics & Data Analysis, 2003, pp. 121-137, vol. 43.

Robert L. Camp et al., "Automated subcellular localization and quantification of protein expression in tissue microarrays", Nature Medicine, Nov. 2002, pp. 1323-1328, vol. 8, No. 11.

K. Martin Hoffman, et al., "Gastrointestinal Hormones Cause Rapid c-Met Receptor Down-regulation by a Novel Mechanism Involving Clathrin-mediated Endocytosis and a Lysosome-dependent Mechanism", Journal of Biological Chemistry, Dec. 8, 2006, pp. 37705-37719, vol. 281, No. 49.

Gagani Athauda et al, "c-Met Ectodomain Shedding Rate Correlates with Malignant Potential", Clin Cancer Res, Jul. 15, 2006, pp. 4154-4162, vol. 12, No. 14.

S. Kermorgant et al., "c-Met Signalling: Spatio-Temporal Decisions", Cell Cycle, Mar. 2005, pp. 352-355, vol. 4, Issue 3.

Wolfgang Hilbe, et al., "Comparison of automated cellular imaging system and manual microscopy for immunohistochemically stained cryostat sections of lung cancer specimens applying p53, Ki-67 and p120", Oncology Reports, May 13, 2003, pp. 15-20, vol. 10.

James D. Cowan et al., "Cruella, Develop mg a Scalable T ssue M Croarray Data Management System", Arch Pathol Lab Med, Jun. 2006, pp. 817-822, vol. 130.

(Continued)

*Primary Examiner* — Carolyn L. Smith
(74) *Attorney, Agent, or Firm* — Jenifer E. Haeckl

(57) ABSTRACT

A system for analyzing tissue samples, that generally comprises, a storage device for at least temporarily storing one or more images of one or more cells, wherein the images comprise a plurality of channels; and a processor that is adapted to determine the extent to which a biomarker may have translocated from at least one subcellular region to another subcellular region; and then to generate a score corresponding to the extent of translocation.

9 Claims, 11 Drawing Sheets

OTHER PUBLICATIONS

Michael Mengel, M.D., et al., "Standardized On-Slide Control for Quality Assurance in the Immunohistochemical Assessment of Therapeutic Target Molecules in Breast Cancer", The Breast Journal, 2005, pp. 34-40, vol. 11, No. 1.

Cesar Eguiluz, et al., "Multitissue array review: A chronological description of tissue array techniques, applications and procedures", Pathology-Research and Practice, 2006, pp. 561-568, vol. 202.

Ashburner et al, "Unified Segmentation", Academic Press, vol. 26, No. 3, Jul. 1, 2005, pp. 839-851.

DeBruijne et al., "Multi-object Segmentation Using Shape Particles", Information Processing in Medical Imaging; vol. 3565. Jul. 10, 2005, pp. 762-773.

PCT Search Report & Written Opinion—Mar. 27, 2009.

Thevenaz, Optimization of Mutual Information for Multiresolution Image Registration, *IEEE Transactions on Image Processing*, vol. 9, No. 12, pp. 2083-2099, Dec. 2000.

Rodenacker, et al, A Feature Set for Cytometry on Digitized Microscopic Images, *Analytical Cellular Pathology*, 25, pp. 1-36, 2003.

Erlandsson, et al., Abnormal Expression Pattern of Cyclin E in Tumor Cells, *Int. J. Cancer*, 104, pp. 369-375, 2003.

Van Vlierberghe, et al., Four-Color Staining Combining Fluorescence and Brightfield Microscopy for Simultaneous Immune Cell Phenotyping and Localization in Tumor Tissue Sections, *Microscopy Research and Technique*, 67, pp. 15-21, 2005.

Lindblad, et al., Image Analysis for Automatic Segmentation of Cytoplasms and Classification of Rac1 Activation, *Cytometry Part A*, 57A, pp. 22-33, 2004.

Gerstner, et al., Quantitative Histology by Multicolor Slide-Based Cytometry, *Cytometry Part A*, 59A, pp. 210-219, 2004.

Wahlby, et al., Sequential Immunofluorescence Staining and Image Analysis for Detection of Large Numbers of Antigens in Individual Cell Nuclei, *Cytometry*, 47, pp. 32-41, 2002.

Hermiston, et al., Simultaneous Localization of Six Antigens in Single Sections of Transgenic Mouse Intestine Using a Combination of Light and Fluorescence Microscopy, *The Journal of Histochemistry and Cytochemistry*, vol. 40, No. 9, pp. 1283-1290, 1992.

Wahlby, et al., Algorithms for Cytoplasm Segmentation of Fluorescence Labelled Cells, *Analytical Cellular Pathology*, 24, pp. 101-111, 2002.

R.T. Altstock, et al., "Algorithms for Quantitation of Protein Expression Variation in Normal Versus Tumor Tussue as a Prognostic Factor in Cancer: Met Oncogene Expression, and Breast Cancer as a Model", *Cytometry* 41, 2000, pp. 155-165.

J.B. Antoine Maintz and Max A. Viergever, "A Survey of Medical Image Registration", *Medical Image Analysis*, 1998, vol. 2, No. 1, pp. 1-37.

PCT/US2007/074380, PCT Search Report, Jun. 2, 2009.

W. Chen et al., "A Prototype for Unsupervised analysis of Tissue Microarrays for Cancer Research and Diagnostics," IEEE Transactions on Information Technology in Biomedicine, vol. 8, No. 2, Jun. 2004. pp. 89-96.

P. Capodieci et al., "Gene expression profiling in single cells within tissue," 2005 Nature Publishing Group, vol. 2, No. 9, Sep. 2005, pp. 663-665.

W. Schubert et al., : Analyzing proteome topology and function by automated multidimensional fluorescence microscopy, 2006 Nature Publishing Group, http://www.nature.com/naturebiotechnology, Oct. 2006, pp. 1-11.

W. Schubert, "Exploring Molecular Networks Directly in the Cell," 2006 International Society of Analytical Cytology, Cytometry Part A, vol. 69A, 2006, pp. 109-112.

R. F. Murphy, "A combination of microscope technology and statistical analysis enables the identification of proteins that share subcellular location patterns," 2006 Nature Publishing Group, Nature Biotechnology, vol. 24, No. 10, Oct. 2006, pp. 1223-1224.

T. W. Nattkemper et al., "Human vs. machine: evaluation of fluorescence micrographs," Pergamon, Computers in Biology and Medicine, Computers in Biology and Medicine, vol. 33, 2003, pp. 31-43.

T. W. Nattkemper et al., "A hybrid system for cell detection in digital micrographs," Paper presented @ Biomedical Engineering Conference, Feb. 16-18, 2004, 4 pages.

T.W. Nattkemper et al., "A Neural Network Architecture for Automatic Segmentation of Fluorescence Micrographs," ESANN' 2000 proceedings—European Symposium on Artificial Neural Networks, (Belgium), Apr. 26-28, 2000, ISBN 2-930307-00-5, pp. 177-182.

A. V. Kuznetsov et al., "Functional Imaging of Mitochondria in Saponin-permeabilized Mice Muscle Fibers," The Journal of Cell Biology, vol. 140, No. 5, Mar. 9, 1998, pp. 1091-1099.

K. Rodenacker et al., "A feature set for cytometry on digitized microscopic images," Analytical Cellular Pathology, vol. 25, 2003, pp. 1-36.

\* cited by examiner

SYSTEMS FOR ANALYZING TISSUE SAMPLES

CROSS REFERENCE TO RELATED APPLICATIONS

This application is a continuation-in-part of U.S. patent application Ser. No. 11/500,028, entitled "System and Method for Co-Registering Multi-Channel Images of a Tissue Micro Array", filed on Aug. 7, 2006, which is herein incorporated by reference.

BACKGROUND

The invention relates generally to tissue micro array processing and diagnosis of disease.

Tissue micro arrays (TMA) are used for many analytic and diagnostic purposes, one of which is to diagnose diseased tissue at the molecular level. Cancer histopathology diagnosis has been based on cellular morphology using hematoxylin and eosin (H&E) stained biopsy tissue with bright field microscopy. Today, oncogenes are detected with immunohistochemistry (IHC) stains in selected diagnostic exams to prescribe drug therapy with new cancer drugs that are only effective in a fraction of patients. Until now, the process for analyzing TMAs to determine whether a given tissue sample indicates disease and more specifically, a certain type or stage of disease was performed by pathologists looking at a given TMA through a microscope and subjectively rendering a conclusion.

For example, breast cancer is not a single disease but multiple diseases where the tumor phenotype is recognizable at the molecular level; molecular marker quantization is needed for diagnosis to prescribe treatment. β-catenin subcellular distribution in breast cancer has been analyzed using immunohistochemistry (IHC) and immunofluorescence (IF) to predict survival. Treatment of breast cancer by estrogen ablation depends on the tumor having an estrogen receptor. As such, IHC testing for the estrogen receptor (ER) is used to prescribe such hormone ablation therapy. The human epidermal growth factor receptor-2 (Her2) is over expressed in approximately 20-30% of breast cancers associated with an aggressive disease course a poor prognosis. A second IHC stain has been used to test for Her2/neu over-expression. The brown staining is scored visually by a pathologist using categories 0, +1, +2, +3 using bright field microscopy. A short course of the monoclonal antibody trastuzumab (Herceptin®), when administered with docetaxel, is effective in women with breast cancer who have an amplified Her2/neu gene.

Translocation activities are used as indicators of various cancers, including but not limited to breast cancer and other epithelial-based cancers. For example, upon Wnt signaling, unphosphorylated β-catenin accumulates in the cytosol and translocates into the nucleus functioning as a transcription factor for a number of target genes that cause tumor development. In the absence of Wnt signaling in normal tissue, phospho-β-catenin is located at the cell-cell adherens junctions associated with cadherins and is rapidly degraded in the cytosol. Glycogen synthase-3β kinase-3β (GSK3β)-mediated phosphorylation promotes rapid β-catenin degradation in proteasomes. In breast cancer, membranous β-catenin expression correlates with improved survival, while phospho-β-catenin cytosol expression correlates with poor survival. Tamoxifen resistant cell lines undergoing an epithelial to mesenchymal transition involves modulation β-catenin phosphorylation. β-catenin plays a role in other epithelial cancers as well.

Manual analysis of TMAs is expensive and time consuming and necessarily dependent on the pathologist's visual assessment. Although tissue micro-arrays (TMAs) have had the potential to provide a means for high throughput analysis of large patient cohorts, the large amount of information in the TMAs and the high dimensional nature of the data require automated and robust image analysis tools that have not previously been available.

BRIEF DESCRIPTION

The methods and systems of the invention provide an automated image analysis framework that can be used automatically quantify and score digital images of tissue samples for a variety of applications including, but not limited to screening patients for cancer, and even specific stages and types of cancer, and to identify and quantify multiple biomarkers in a single tissue sections to develop cancer drug therapies. The technical effect of these methods and systems is to enable automatic analysis of multi-channel tissue images; simultaneous analysis/quantification of multiple biomarkers; high throughput analysis of large patient cohorts; spatially resolved quantification; and compartment based biomarker analysis for cancer scoring. Multiple biomarkers that express different pathways may be used in prescribing therapy. The methods and systems of the invention generally directed at digital microscopy are adapted to replace visual observation and image processing as an important aid to pathologists.

Immunofluorescence is often used to determine protein distributions in sub-cellular compartments. By measuring the ratio of a biomarker in two different compartments, the factors that influence the image intensity are removed from analysis. Rather than acquiring and subtracting out-of focus from an in-focus image to reduce the slowly varying background, one or more of the preferred methods uses a high pass filter to obtain the same effect as two separate acquisitions.

The methods and system generally utilize multi-channel images of different biomarkers that are obtained through sequential staining steps. These images are then corrected for non-uniform illumination. In one or more of the embodiments, a robust, multi-resolution image registration algorithm is applied to transform images into the same coordinate system. In some of the embodiments, a k-means segmentation method is then applied to segment the registered images into sub-cellular compartments. The algorithms are useful for a number of applications and are adapted to cope with images with arbitrary number of channels that are acquired in any number of steps.

Unlike previous methods, the technical effect of the sequential imaging and registration methods and system disclosed herein is to enable multiple channels to be digitally analyzed and scored. As noted, fluorescent markers were previously used alone to identify the nuclei, epithelia and stroma to provide information about the cell compartments. In various embodiments of the methods of the invention, morphological function of fluorescent markers is combined with the function of fluorescent biomarkers to sequentially digitize, process and score the images.

An embodiment of the system for analyzing tissue samples, generally comprises: a storage device for at least temporarily storing one or more images of one or more cells, wherein the images comprise a plurality of channels; and a processor comprising, a means for determining an extent to which a biomarker may have translocated from at least one subcellular region to another subcellular region; and a means for generating a score corresponding to the extent of translocation. The score may indicate whether the tissue is cancerous and/or whether the cancerous tissue is metastasizing. The system may be adapted to determine scores directed at translocation that indicates the presence of cancer. The system may be further adapted to determine translocation indicative of a specific group of cancers such as epithelial cancers consisting of breast cancer, colon cancer and melanoma however, the system is not necessarily limited to epithelial cancers or to specific types of epithelial cancers. The channels preferably comprise at least one biomarker and one morphological stain.

The means for determining the extent to which the biomarker has translocated may determine the translocation at least in part using a correlation between at least one image comprising a biomarker channel and at least one image comprising a morphological channel, and a ratio of average intensity of the biomarker in a membrane subcellular region and another subcellular region. The sub cellular regions may comprise any cellular component or region such as but not limited to the membrane, cytoplasm, nucleus, stromal tissue and muscle tissue. The means for determining may apply a high pass unsharp mask filter to the image comprising the biomarker channel and the image comprising the morphological channel.

The means for determining the extent to which the biomarker has translocated may determine the translocation at least in part by segmenting at least one image comprising a biomarker channel and at least one image comprising a morphological channel into subcellular regions, and determining a ratio of average intensity of the biomarker in a membrane subcellular region and another subcellular region. The means for determining may segment the images in part by: estimating one or more K initial cluster centers $\bar{x}(k)$; labeling one or more N-dimensional voxel vectors x with a closest cluster center $L(x, y) = \arg\min \|x - \bar{x}(k)\|$; and updating the cluster centers $\bar{x}(k)$ using one or more label masks until one or more cluster centers vectors remain constant.

Another embodiment of the system for analyzing tissue samples, generally comprises: a storage device for at least temporarily storing one or more images of one or more cells, wherein the images comprise a plurality of channels; and a processor generally comprising, a means for determining an extent to which a biomarker may have translocated from at least one subcellular region to another subcellular region, wherein the determination is made at least in part by applying a high pass unsharp filter to at least one image comprising a biomarker channel and at least one image comprising a morphological channel, correlating the filtered images, and determining a ratio of average intensity of the biomarker in one of the subcellular regions and another subcellular region; and a means for generating a score corresponding to the extent of translocation.

Another embodiment of the system for analyzing tissue samples, generally comprises: a storage device for at least temporarily storing one or more images of one or more cells, wherein the images comprise a plurality of channels; and a processor generally comprising, a means for determining an extent to which a biomarker may have translocated from at least one subcellular region to another subcellular region, wherein the determination is made at least in part by segmenting at least one image comprising a biomarker channel and at least one image comprising a morphological channel into subcellular regions, and determining a ratio of average intensity of the biomarker in a membrane subcellular region and another subcellular region; and a means for generating a score corresponding to the extent of translocation.

DRAWINGS

These and other features, aspects, and advantages of the present invention will become better understood when the following detailed description is read with reference to the accompanying drawings in which like characters represent like parts throughout the drawings, wherein.

Figure 4:
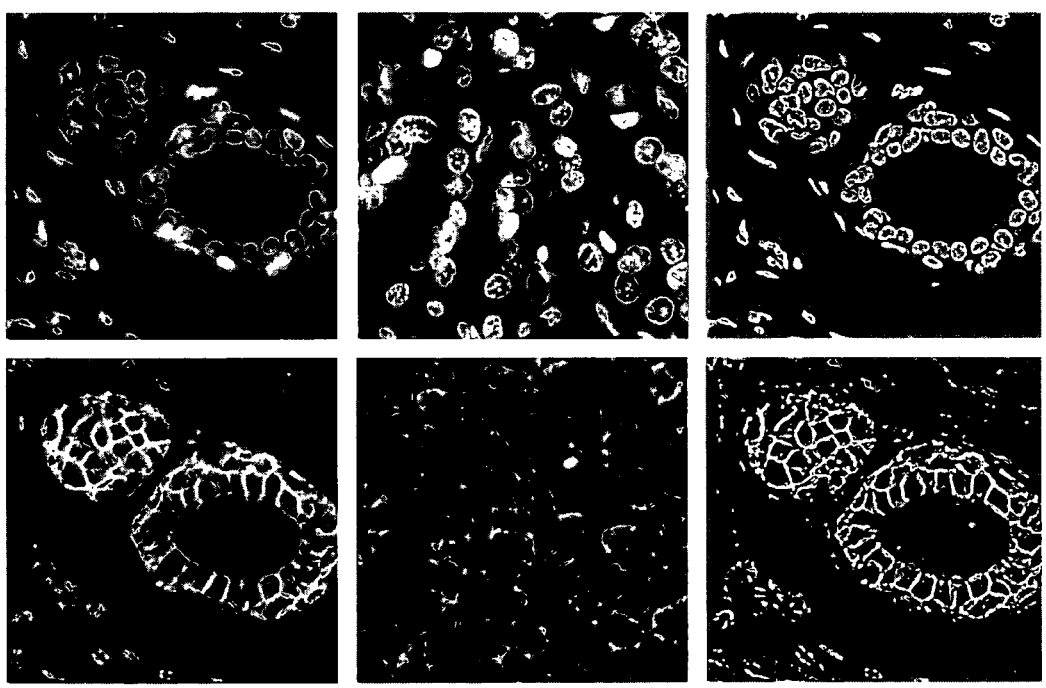

FIG. 4 illustrates various embodiments of the images of the methods and systems: in normal tissue, beta-catenin contrasts the (a) membrane and DAPI (4',6-diamidino-2-phenylindole) contrasts the (b) nuclei in normal tissue; in breast cancer, beta-catenin translocates from the (c) membrane giving reduced contrast and the (d) nuclei contrasted by DAPI are larger in size. Images (e) and (f) illustrate the results after a high pass image-processing filter is applied in an embodiment by subtracting a blurred image from the original to remove the slowly varying auto-fluorescence and to improve the separation between the (e) membrane and (f) nucleus for measuring the image correlation.

Figure 5:
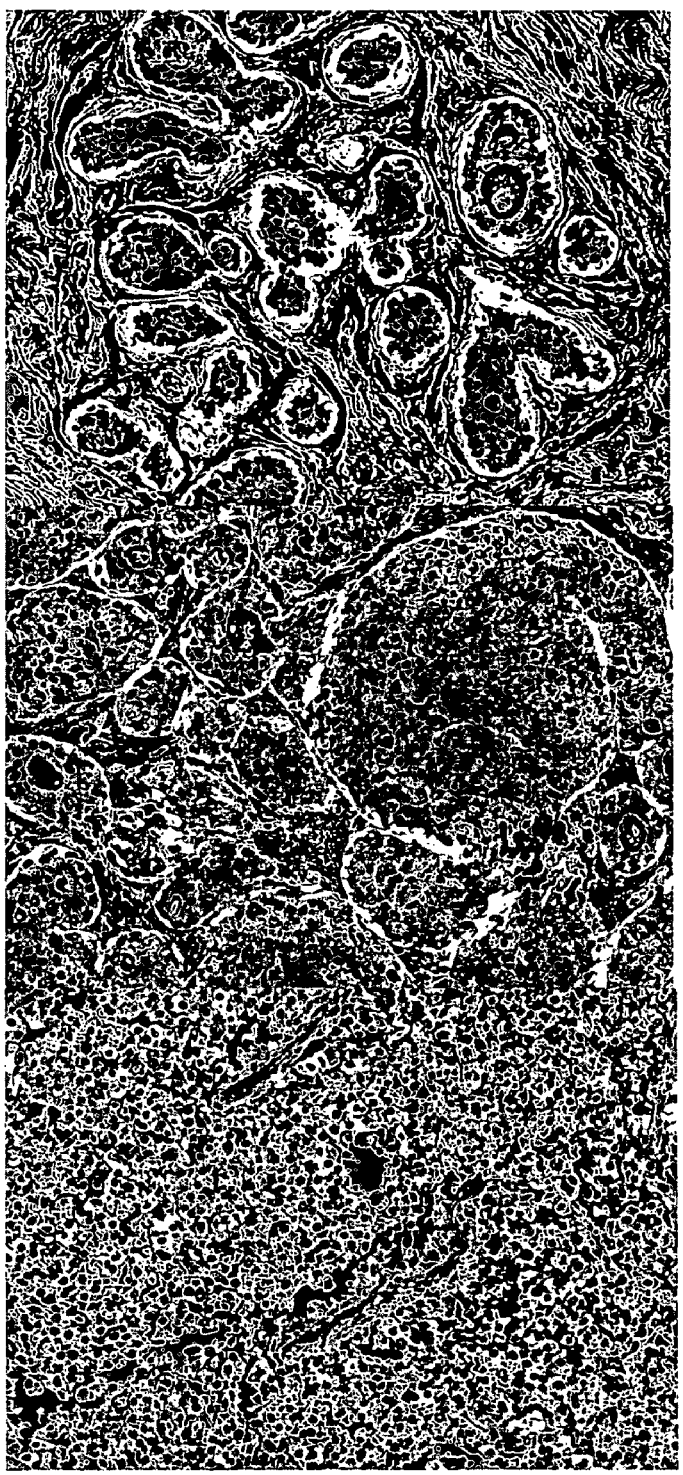

FIG. 5 illustrates various embodiments of the images of the methods and systems using seven channel K-means segmented into five compartments: nuclei, membrane, smooth muscle, stroma and background. In (a), the normal breast ducts comprise epithelial tissue surrounded by muscle; in (b), ductal carcinoma invades the normal tissue; and in (c), aggressive cancer cells become undifferentiated and the membrane structure is not contrasted.

Figure 6:
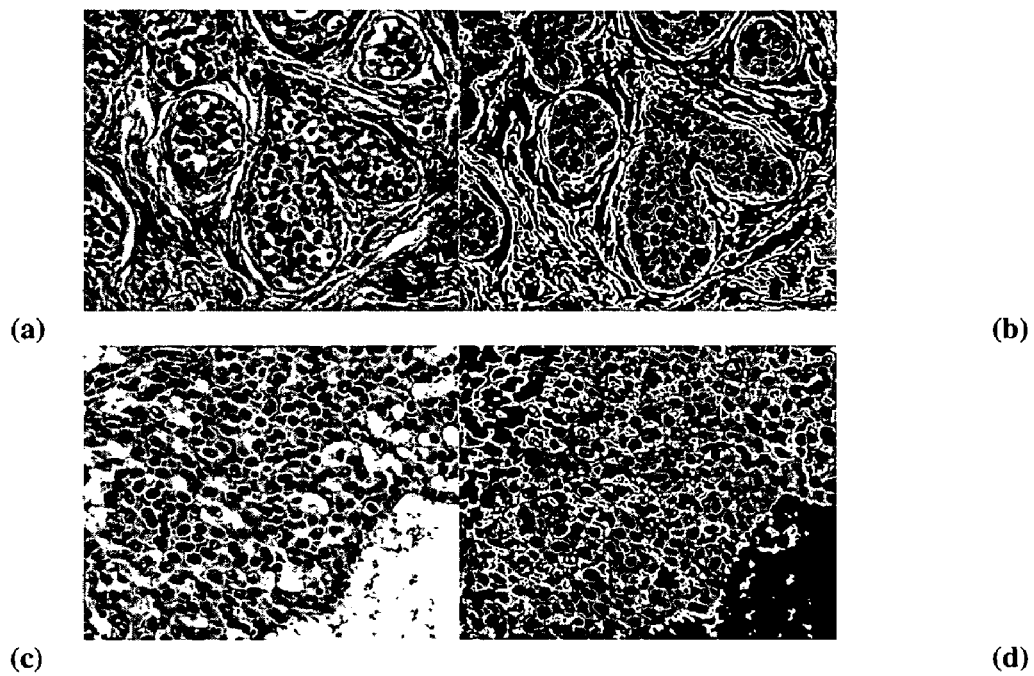

FIG. 6 illustrates various embodiments of bright field H&E images in which (a) and (c) were registered with immunofluorescence images (b) and (d). In these embodiments, four compartments were segmented: nuclei, membrane, stroma and background.

Figure 7:
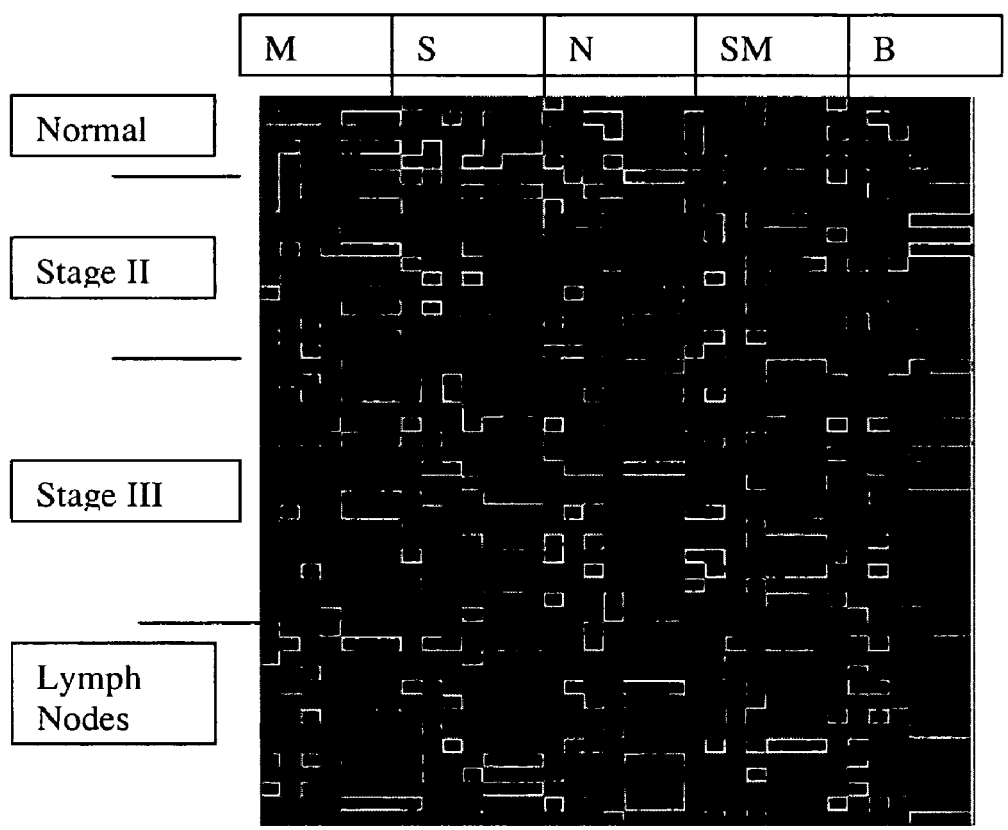

FIG. 7 shows an embodiment of a heat plot constructed from the segmentation of fifty breast tissues grouped into four histopathology stages. Each row was constructed using five marker mean intensities in seven compartments giving a 35 dimensional feature vector. There was a significant pattern difference between Stage II and III and between Normal and Stage III. The columns are groups of five compartments: M=membrane, S=stroma, N=nucleus, SM=smooth muscle, and B=backround. Within each group there are seven channel markers: β-catenin; keratin, DAPI, smooth muscle actin, H&E red, green and blue.

Figure 8:
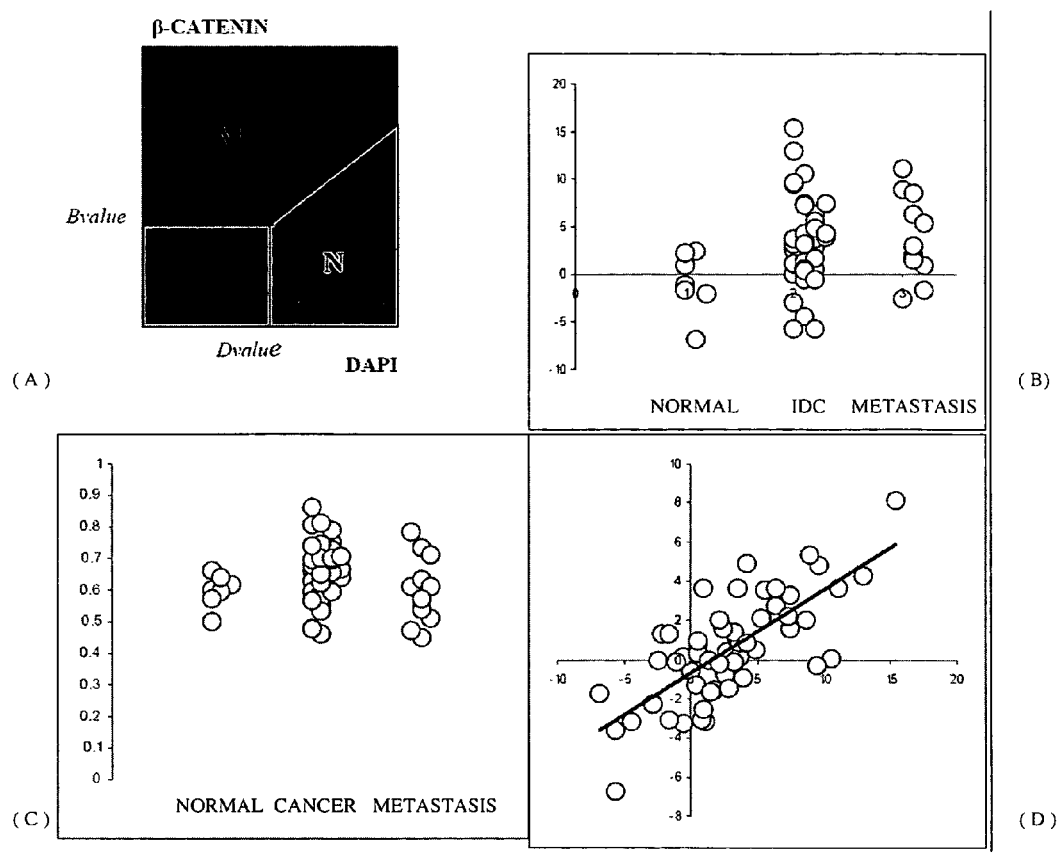

FIG. 8 illustrates embodiments of: (a) pixels segmented into membrane M and nuclei N in beta-catenin and DAPI feature space; (b) and (c) scatter plots of normal, IDC and metastasized clusters; and (d) a scatter plot comparing a correlation translocation score with a segmentation score.

Figure 9:
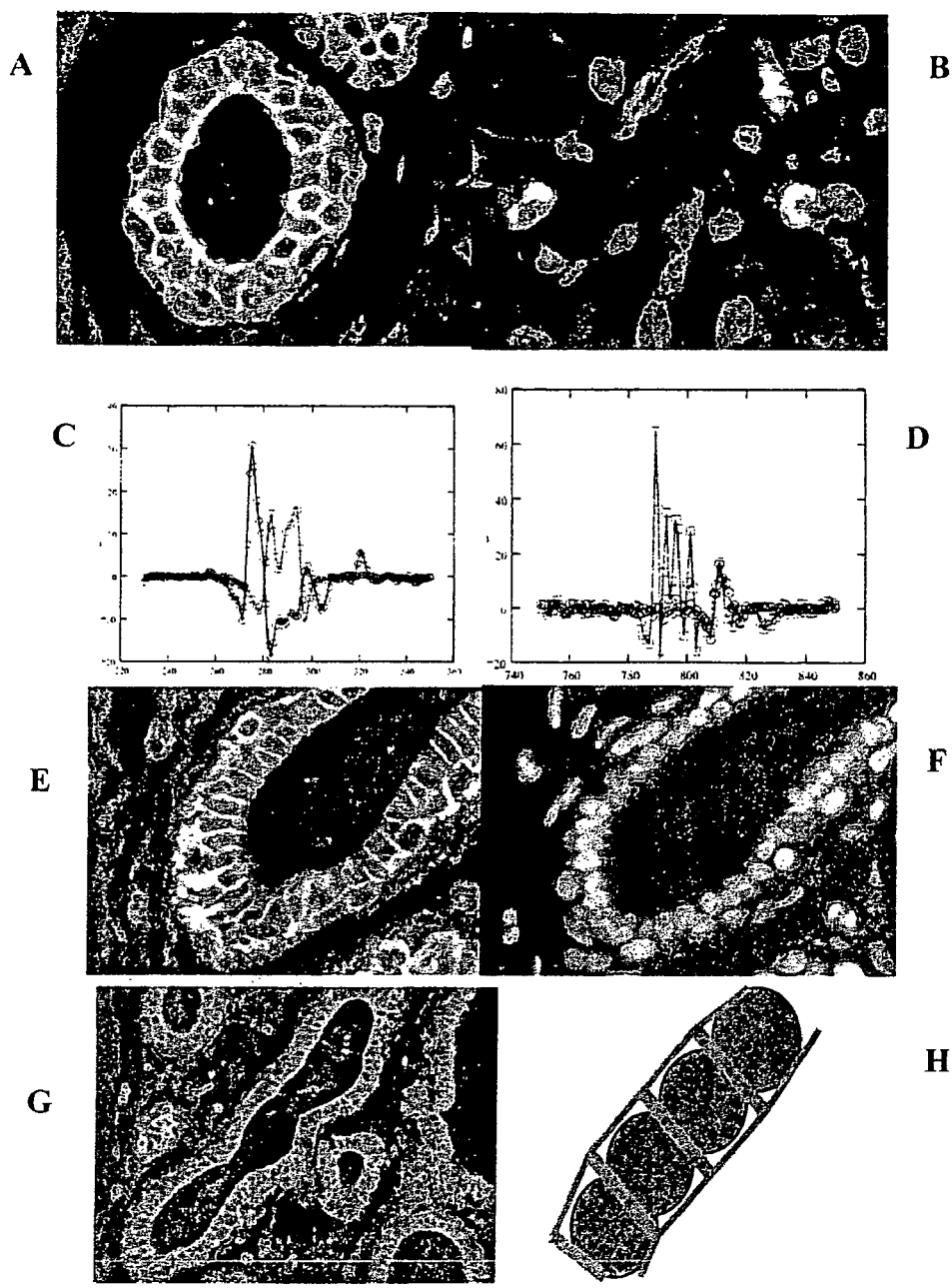

FIG. 9 illustrates embodiments of: (a) an image of normal duct cells; (b) an image of IDC cells; (c) a graph of beta-catenin and DAPI profiles of normal tissue that are anti correlated; (d) a graph of beta-catenin and DAPI profiles of cancerous tissue that are correlated; (e) an image of normal duct cells showing beta-catenin concentrated in the cell membrane; (f) an image of the normal duct cells in (e) showing the corresponding DAPI stain concentrated in the nuclei; (g) a registered three-channel image of DAPI stained nuclei; and (h) a schematic diagram showing a beta-catenin stained membrane overlapping DAPI stained nuclei.

Figure 10:
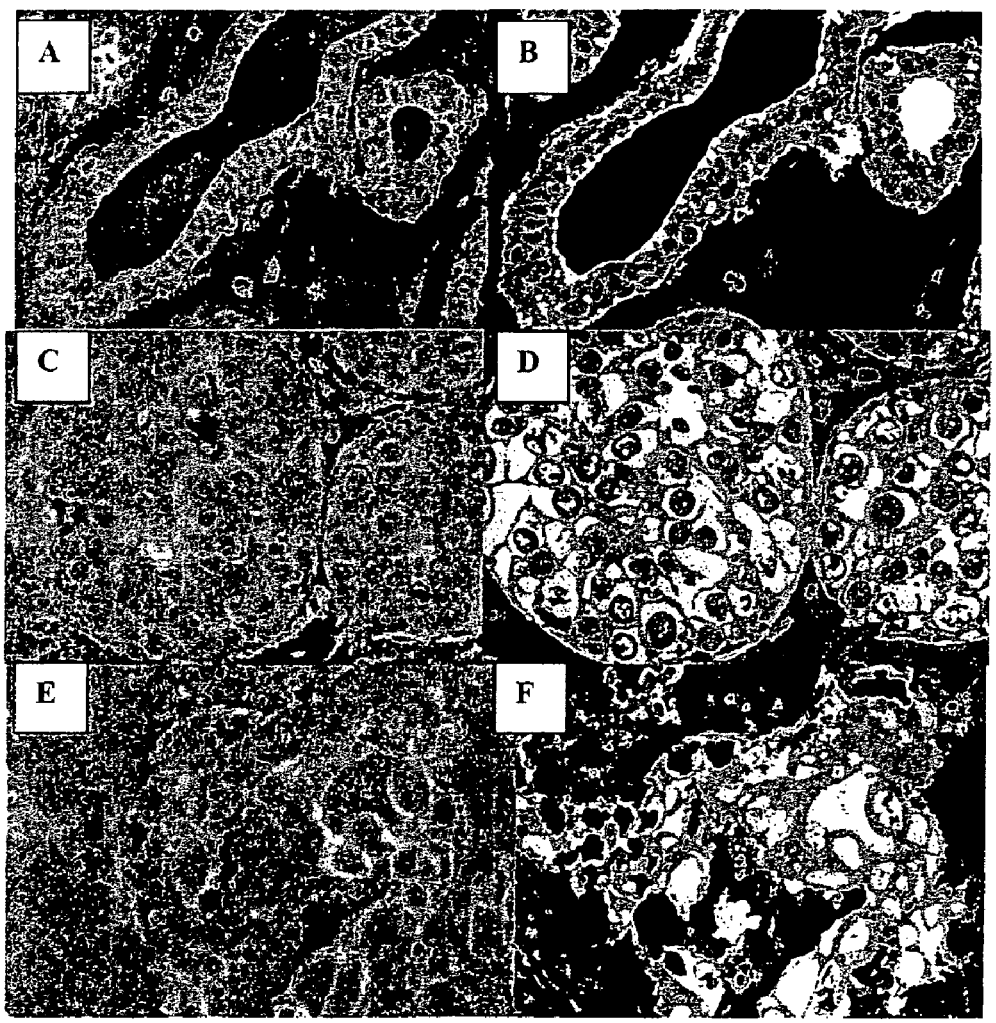

FIG. 10 illustrates embodiments of: fluorescent and segmented image pairs, respectively: (A-B) normal breast tissue showing duct cells with rings of nuclei; (C-D) infiltrating duct carcinoma cells showing growth of epithelial tissue; and (E-F) showing undifferentiated morphology indicating a poor histopathic prognosis.

Figure 11:
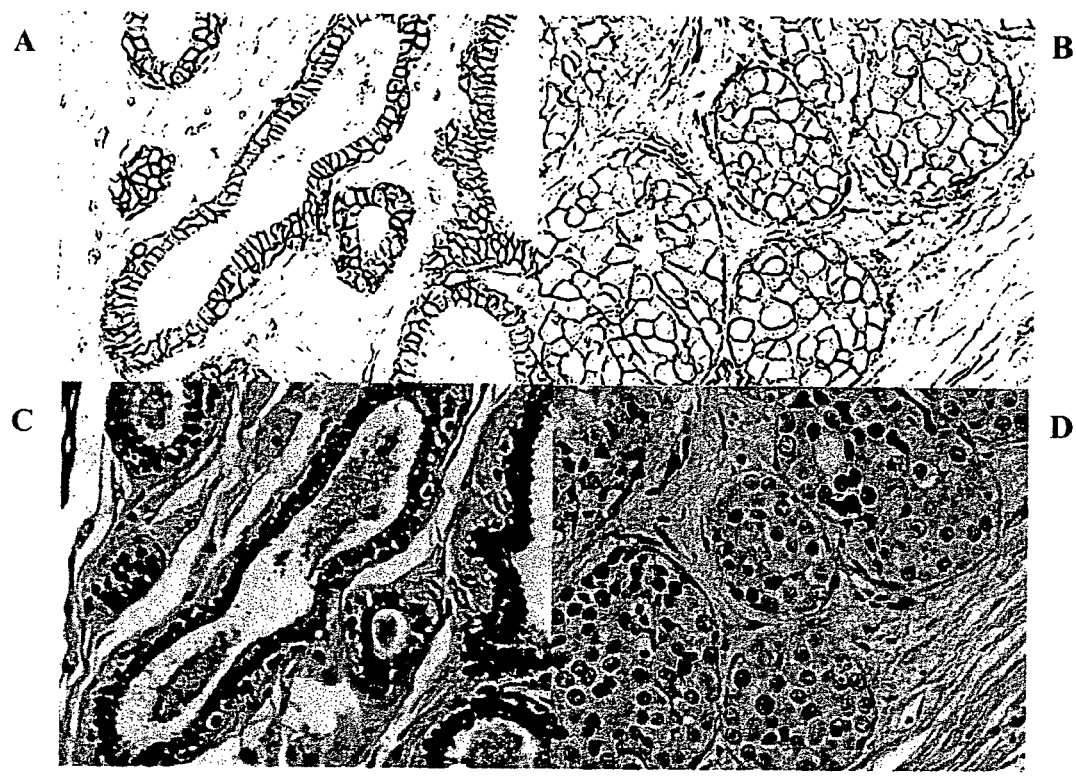

FIG. 11 illustrates embodiments of images of: (a) normal breast tissue; (b) infiltrating duct carcinoma cells; (c) registered images of normal breast tissue; and (d) infiltrating duct carcinoma cells using bright field H&E digital microscopy.

Figure 12:
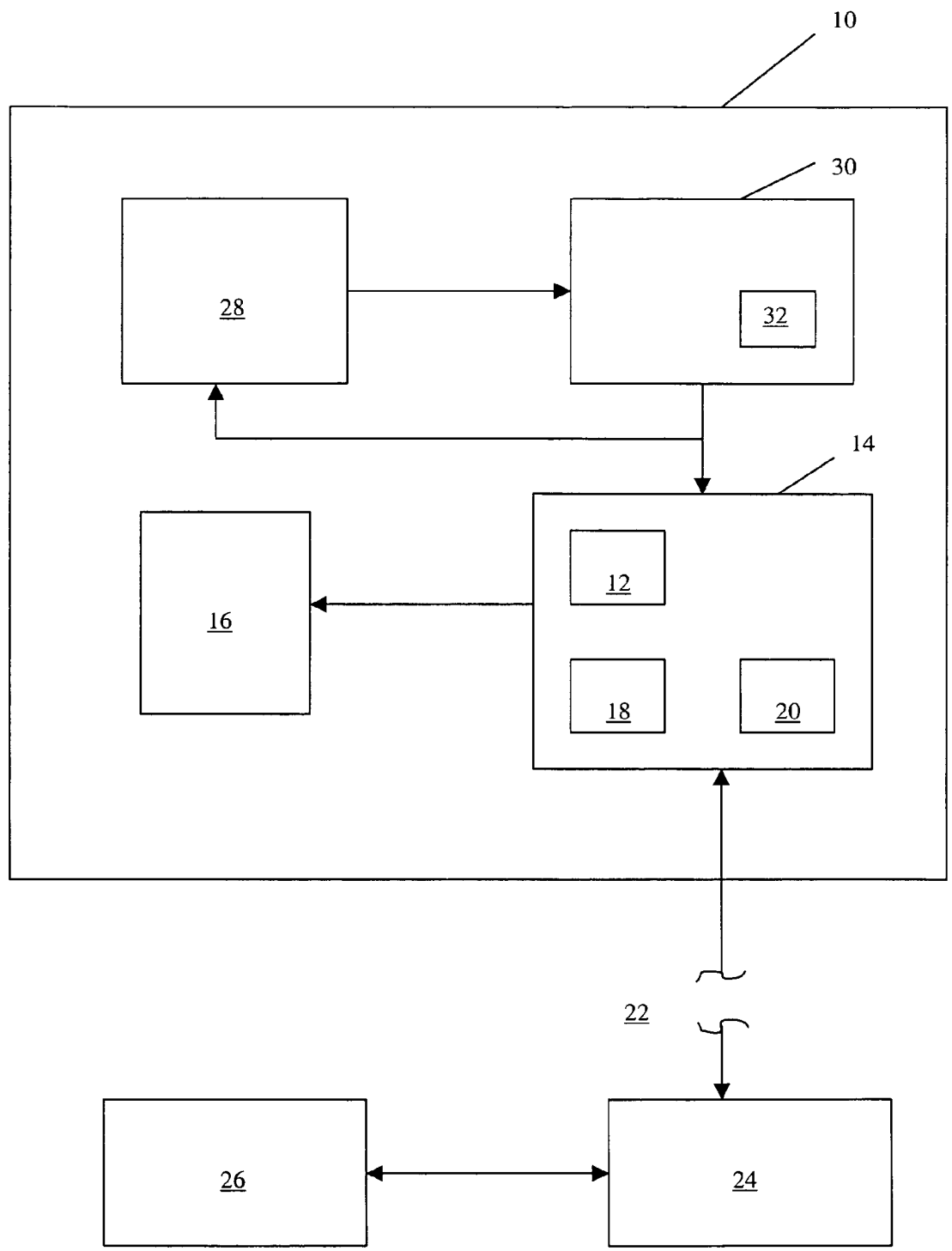

FIG. 12 is a schematic diagram of an embodiment of the automated system for carrying out the methods.

DETAILED DESCRIPTION

Figure 1:
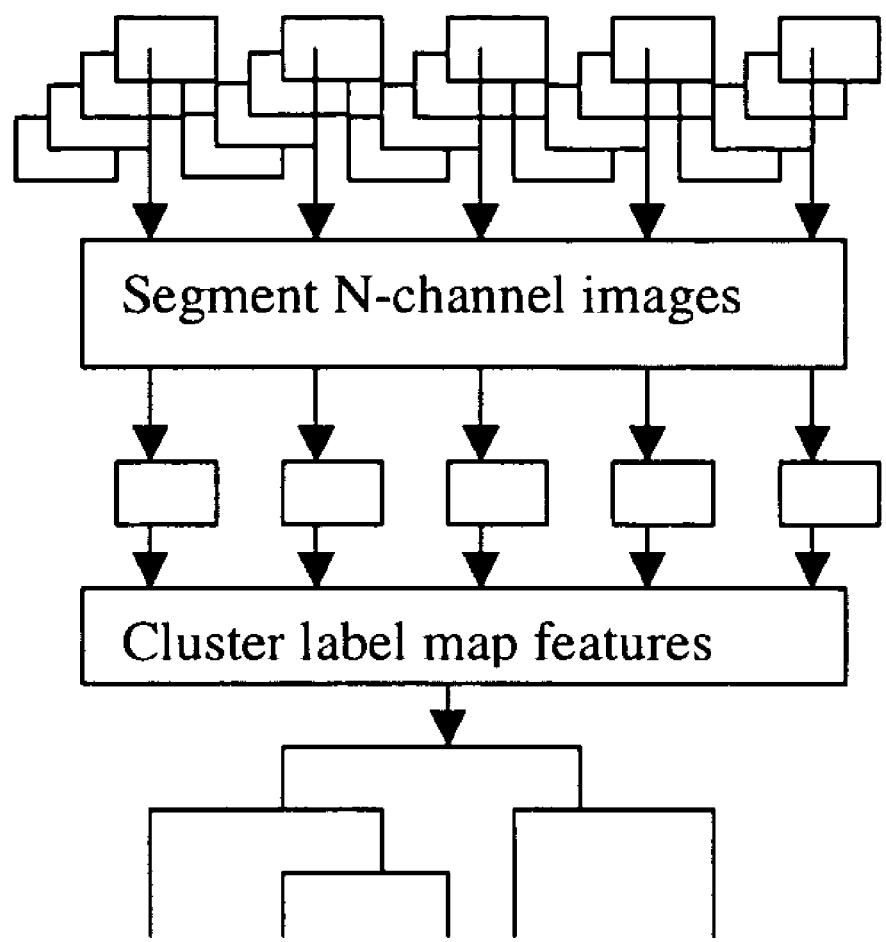
FIG. 1 is a diagrammatic view of an embodiment of N-channel TMA images that are segmented into K regions and the features derived from the label maps are shown clustered into tissues with similar cancer stages.

A multidimensional image represents the different markers for protein distributions. Multiple image sets were acquired with tissue microarrays. An automatic image segmentation method reduces the N-channel images to a single channel label map of the cellular regions. Distributions of the protein expressions in the regions provide a feature vector for each tissue in the TMA. By clustering the features, tissues with similar properties are identified and related to stages of cancer or to the outcome of patients in a clinical trial, as illustrated in FIG. 1.

One or more of the methods and systems of the invention are used to localize multiple biomarkers in a single tissue by registering images acquired on the same tissue after several staining steps. Images may be acquired with both immunofluorescence (IF) and bright field H&E stains.

The preferred methods and preferred embodiments of system of the invention allow both molecular and morphological markers to be imaged from the same tissue sample. Generally, the tissue, which is fixed or otherwise provided on a substrate such as, but not limited to, a TMA, a slide, a well, or a grid, is labeled with molecular biomarkers, and imaged through a fluorescent microscope. Then the tissue is re-labeled with one or more morphological stains such as H&E dyes, and imaged again. The methods are not limited to two images and can be adapted to co-register more than two images as needed. The images are overlaid using both hardware and software registration techniques, and the information is merged, whereby one of the technical effects is to co-register or otherwise produce multi-channel images.

A variety of molecular biomarkers may be used such as fluorescent dyes bound to antibodies or proteins. Then the tissue may be imaged under a fluorescent microscope using an excitation energy source that is tuned to the given biomarkers, and using various filters that are adapted to optimally collect the emitted light. Multiple biomarkers can be imaged simultaneously without moving the specimen under the microscope, or sequentially. For different biomarkers the excitation wavelength and the filters can be changed. Biomarkers may include, but are not limited to, the following list of markers which comprises a brief description of one or more but not necessarily all of the functions of each marker:

Her2/neu: epidermal growth factor over expressed in breast and stomach cancer, therapy by a monoclonal antibody slows tumor growth EGF-R/erbB: epidermal growth factor receptor ER: estrogen receptor required for growth of some breast cancer tumors, located in the nucleus and detected with ICH for deciding on therapy limiting estrogen in positive patients PR: progesterone receptor is a hormone that binds to DNA AR: androgen receptor is involved in androgen dependant tumor growth P53: tumor suppressor gene senses DNA damage is inactivated in 50% of human cancer β-catenin: oncogene in cancer translocates from the cell membrane to the nucleus, which functions in both cell adhesion and as a latent gene regulatory protein Phospho-β-Catenin: phosphorylated form of β-catenin degrades in the cytosol and does not translocate to the nucleus GSK3β: glycogen synthase kinase-3β protein in the Wnt pathway phosphorylates β-catenin marking the phospo-β-catenin for rapid degradation in the protosomes PKCβ: mediator G-protein coupled receptor NFKβ: nuclear factor kappa B marker for inflammation when translocated to the nucleus Bcl-2: B cell lymphoma oncogene 2 acts as an apoptosis inhibitor CyclinD: cell cycle control VEGF: vascular endothelial growth factor related to angiogenesis E-cadherin: cell-to-cell interaction molecule expressed on epithelial cells, the function is lost in epithelial cancers c-met: tyrosine kinase receptor.

At least one additional fluorescent morphological marker that carries a compartmental information is also included in this step. This marker is chosen such that it carries common information with the next step. This is essential to register the images.

Next, the tissue section may be labeled with a morphological marker such as the traditional H&E dyes, and placed at the same location under the microscope. The location of the specimen under the microscope may be controlled with electronic, magnetic, optical or mechanical sensors so that the specimen can be repeatedly located close to the same position for the next image acquisition. The microscope is designed so that it can acquire both bright field and fluorescent images. One such microscope may involve calibrated multiple optical paths and multiple cameras. After which, a bright field image of the tissue section is obtained using a digital camera. The images are then registered to align them accurately. The registered images may be combined as single multi-channel image or in multiple registered images. Morphological markers may include, but are not limited to, the following:

Keratin: marker for epithelial cells

Pan-cadherin: marker for the cell membrane

Smooth muscle actin: marker for muscle

DAPI: marker for the nucleus

Hematoxylin marker for DNA (blue stain)

Eosin: marker for cytoplasm depends on pH (red stain).

Some of these morphological markers can be imaged using a brightfield microscope, and some with a fluorescent microscope. In any case, the morphological marker may be chosen so that that it has common information with the earlier step. For example, if DAPI is used to image the nuclei in the earlier step, hematoxylin can be used to image the nuclei under a bright field microscope in the second step. Since they both stain the same compartment, the images may be aligned by image registration techniques.

As noted, the tissue may be first labeled with one or more molecular biomarkers such as an IHC or one or more fluorescent dyes. These dyes may have different characteristics, and may be binding to different compartments and proteins in the tissue. For example, beta-catenin may be used to highlight membrane-associated regions. Then the tissue may be imaged under a fluorescent microscope with an appropriate excitation energy source tuned to a given biomarker and with filters appropriate for collecting the emitted light. Similarly, multiple biomarkers can be imaged simultaneously without moving the specimen under the microscope, or sequentially. As noted, the excitation wavelength and the filters may be changed for different markers.

The number of channels in the biomarker image is application specific, and may be based on how many compartments and protein associations are needed for the specific task. Usually three or four dyes can be easily applied simultaneously. There are some protein specific molecular biomarkers, such as beta-catenin that can bind to multiple compartments. If none of the desired biomarkers have any common compartmental information that can be used to register with the H&E images, an extra fluorescent nuclear marker may be added so that the nuclear marker can be registered with nuclei stained with hematoxylin in the bright field images. For example, DAPI can be used as a nuclear stain, which emits blue fluorescence when bound to DNA and excited by UV light. Provided that there are common compartments/information between the H&E and the biomarker images, these methods can be applied to a broad class of biomarkers.

As noted, the segmentation and correlation methods of the invention may be used to score tissue samples. One or more of the correlation-based embodiments generally use two images to determine translocation. Instead of acquiring both in-focus and out of focus images as used in previous imaging methods, a blurring filter is optimally used in some of the embodiments to create an out-of-focus image. One or more of the segmentation-based embodiments use registered sequentially stained fluorescence and registered bright field H+E images on the same tissue to identify sub-cellular regions.

One example of the methods uses a biomarker β-catenin system. As noted, the oncogene β-catenin is associated with the adhesion proteins in the cell membrane. When β-catenin translocates to the cytoplasm and then to the nucleus, where it influences transcription, this is shown to lead to cancer metastasis in breast cancer patients and poor prognosis. Multidimensional image segmentation methods of the invention, using a k-means algorithm in some of the embodiments, provide the distribution of multiple markers in selected sub-cellular tissue compartments.

β-catenin changes, in intracellular location from the membrane to the nucleus, are generally correlated with poor breast cancer outcome. One of the embodiments of the methods and systems automatically analyzes sub-cellular β-catenin epithelial distributions in breast tissue microarrays using both registered immunofluorescence and bright field images. Sequential staining and automatic registration are used to provide images with multiple channels including, but not limited to, β-catenin, DAPI, keratin, smooth muscle actin and H&E images. These channels are then segmented to define subcellular tissue compartments. In one example embodiment, β-catenin translocation can be detected using correlation between high pass filtered β-catenin and DAPI images, and the ratio of average β-catenin intensity in the nucleus and membrane region. In some of the embodiments, tissue microarrays are alternately stained and bleached to give registered dark field and bright field images segmented with k-means multi dimensional clustering into nuclei, membrane, stroma and background. Mean β-catenin ratios for nuclei and membranous regions are used to generate a score discriminating normal and breast cancer (P=0039). Filtering the images reduces the background auto-fluorescence and the signal overlap. This improves the discrimination between normal and invasive ductal carcinoma and metastasis in the lymph nodes.

Example 1

Four TMA's were obtained from Imgenex containing paraffin-embedded human breast tissue with both normal, infiltrating ductal carcinoma and metastasis in the lymph nodes. The four TMA's were produced from a single block of 60 patient cores. TMA slides of the samples were stained with conjugated antibodies using Cy3 and Cy5 fluorescence dyes and then photographed at 20× using a biological microscope. The stains were removed and the process repeated using the dyes listed in Table I below. For each staining step, the TMAs were counterstained with DAPI for registration of the nuclei. A final H&E stain was applied to add three more channels for analysis.

TABLE I

Stains for four TMAs from adjacent tissue sections of the same patients and the p-values for the correlation score separating normal and IDC breast cancer

| | Stains | P value |
|---|---|---|
| 1 | Cy3 β-catenin DAPI | 0.24 |
| 2 | Secondary cy3 keratin, DAPI, cy3 β-catenin, smooth muscle actin, H&E | 0.25 |
| 3 | Cy3 β-catenin DAPI | 0.15 |
| 4 | Secondary Cy3 keratin, Secondary Cy5 β-catenin, DAPI, Cy3 pancadherin, Cy5 smooth muscle actin (no normals) | N/A |
| | Average of four TMA's correlation score | 0.036 |

After each tissue-staining step, the image pairs A and B may be registered and aligned by maximizing the mutual information.

$$M(A, B) = H(A) + H(B) - H(A, B) \quad (1)$$

$$H(A) = -\sum_i p_{A_i} \ln(p_{A_i}),$$

$$H(B) = -\sum_i p_{B_i} \ln(p_{B_i})$$

$$H(A, B) = -\sum_j \sum_i p_{A_i B_j} \ln(p_{A_i B_j})$$

are related to the pixel intensity probability in each image $P_A$, $P_B$ and joint probability $P_{AB}$. Both translation and a small rotation T were applied with a multi-resolution search to find the translation T* with maximum mutual information using the open source image toolkit, www.itk.org.

$$T^* = \underset{T}{\mathrm{argmax}}\, M(T(A), B) \quad (2)$$

Two unrelated images A and B with a random pixel relationship between the joint probability and probabilities in each image $P_{AB} = P_A P_B$ will have zero mutual information. In each step of sequential staining a DAPI image was acquired for registration.

After the images are acquired and registered, the images are correlated. The biomarker β-catenin in normal tissue is associated with the membrane while in cancer it translocates to the cytoplasm and then the nuclei. The correlation between the biomarker images and nuclear DAPI images was measured for each tissue sample in the TMAs. The normalized correlation r between two images A and B corrected for the mean intensities becomes $$r = \frac{\sum_i (A_i - \overline{A})(B_i - \overline{B})}{\sqrt{\sum_i |A_i - \overline{A}|^2 \sum_i |B_i - \overline{B}|^2}} \quad (3)$$

The auto-fluorescence noise background is slowly varying compared to the membranous structure. A high pass unsharp mask filter may be used to improve the correlation signal-to-noise. The unsharp filter comprises subtracting the convolved image from the original, giving $$A' = A - A \otimes G \quad (4)$$

using a Gaussian of the form $$G(x, y) = \frac{\exp\left(-\frac{x^2 + y^2}{2\sigma^2}\right)}{2\pi\sigma} \quad (5)$$

with standard deviation $\sigma = 1.8$. This filter enhances edges and reduces the overlap between the membranous and nuclear image. The amount of blurring was trained using the normal images from a single TMA. The filtered biomarker and nuclear images were correlated to estimate the translocation score, represented as a percentage (one hundred times r).

One or more of the embodiments may use segmentation, such as but not limited to K-means segmentation, to cluster the image. For example, the registered four channel IF images and three channel H&E image may be used to identify five sub-cellular compartments membrane, nuclei, smooth muscle, epithelial tissue, the connective tissue and the regions without tissue. The number of tissue types K may be selected from an N-channel image. The K-means algorithm[9] was used twice in this example, first to segment the images for each tissue on the TMA and then to cluster the tissues into different stages. To segment both the N-channel images and P is the number of patient tissues, the following steps may be used:

1. Estimation of K initial cluster centers $\overline{x}(k)$;
2. Labeling the N-dimensional voxel vectors x with the closest cluster center $L(x, y) = \arg\min \|x - \overline{x}(k)\|$;
3. Updating the cluster centers $\overline{x}(k)$ using the label masks until the cluster centers vectors do not change.

The cluster means components $\overline{x}(k,n)$ provide feature vectors in K×N dimensional space for P as the number of patient tissues. A rectangular heat map may be constructed for P samples and K×N features. The distance P×P matrix between samples feature vectors may be estimated using both the normalized Euclidean and Pearson correlation distance 1−r. The tissue samples are clustered using the symmetric distance matrix, A. Multiple clustering algorithms are applied and the clusters compared with the pathology stages. The following steps may also be used:

1. Given a series N-dimensional tissue microarray images I(n,p,x), estimate initial cluster centers $\mu(k,n)^0$, k=[1,K], n=[1,N], p=[1,P] and x=[1,pixels] where K is the number of cellular regions, N the number of channels, and P the number of tissues in the TMA.

2. Label the voxels in each image with the closest cluster center at each pixel in the images $$L(p, x)^t = \arg\min_k \sum_n |I(n, p, x) - \mu(k, n)^{t-1}|^2;$$

where t={1, iteration]

3. Update the each of the K cluster centers $$\mu(k, n)^t = \frac{\sum_{x \in l|k} I(n, p, x)}{\sum_{x \in l|k} 1}$$

4. The cluster center components $\mu(k,n)$ provide feature vectors f(m, p) for P tissues, m=[1,K×N].
5. Estimate initial tissue cluster centers $\mu(s,m)^0$ for K-means clustering with S tissue stages, s=[1,S]
6. Cluster the tissue features to give a tissue labelmap $$L(p)^t = \arg\min_s \|f(m, p) - \mu(s)^{t-1}\|$$

7. Update the cluster centers $$\mu(s, m)^t = \frac{\sum_{p \in P|s} f(m, p)}{\sum_{p \in P|s} 1}.$$

A rectangular heat map may be constructed for P samples and K×N features to cluster the tissues into different disease stages. The distance P×P matrix between samples feature vectors was estimated using both the normalized Euclidean and Pearson correlation distance 1−r. The tissue samples may then be clustered using the K-means segmentation method. Multiple and the clusters compared with the known breast cancer pathology stages supplied with the TMAs.

If desired, the results may be tested to determine if they are statistically accurate. To do so, T-test of two or more samples may be performed at the 95% confidence level on the scores generated for both the correlation method and segmentation methods using appropriate statistics software such as Minitab. The correlation between β-catenin and DAPI images data for this example was acquired on four serial TMA sections for the same patients. The p-values were estimated from the correlation scores of both individual's TMAs and by averaging the replica scores from the different TMAs. These results are shown Table I above. A single TMA was used in the segmentation method that contained four fluorescent and one three-channel bright field image. A feature vector for each tissue was constructed from the mean intensities of the N=7 channel images in the K=5 compartments. A K×N=35 by P=50 matrix was constructed from the features and patients and displayed as a heat plot. Another matrix 5 by 50 was construed from the percentage compartment area. A heat map of the P feature rows and K×N columns was then constructed by standardizing the columns involving subtracting the mean divided by the standard deviation $$f(m, p)' = \frac{f(m, p) - \sum_p \frac{f(m, p)}{P}}{\sqrt{\frac{\sum_p \left[f(m, p) - \sum_p \frac{f(m, p)}{P}\right]^2}{P-1}}}. \quad (6)$$

The rectangular heat map array may be displayed with positive elements and negative elements for visual pattern analysis. A distance map obtained from either the correlation or Euclidean distance between pairs of features may be used to cluster tissues into stages. K-means clustering of the tissues in this example was performed with MiniTab software.

Figure 2:
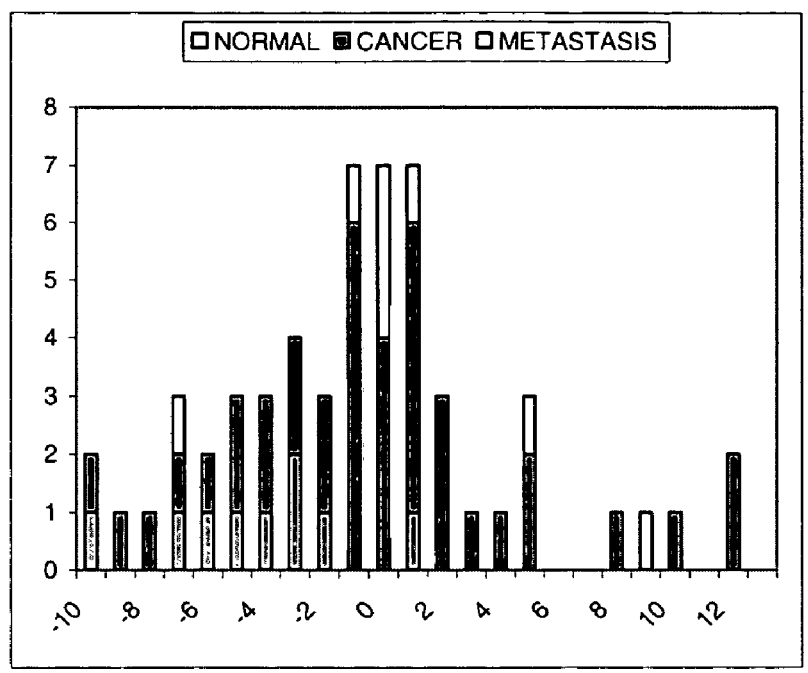
FIG. 2 is a histogram that illustrates an embodiment of correlation scores for each patient that were created by first filtering β-catenin and DAPI images and then measuring the image correlation between the two images. The histogram of the score was constructed from normal, cancer and metastasis tissues.
Figure 3:
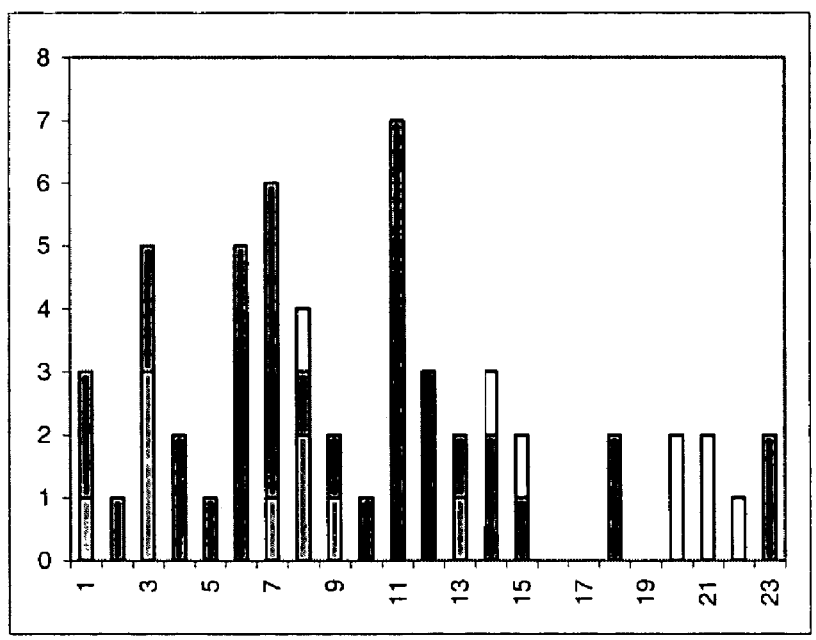
FIG. 3 is a histogram illustrating an embodiment of the segmentation scores comprising the ratio mean β-catenin in nucleus to that in the membrane constructed from normal, cancer and metastasis tissues.

The correlation score (2) averaged for the four arrays gave increasing values from normal, cancer and metastasis as shown in Table I. Individual TMAs did not give a significant P-value between normal and cancer; while, the average or the four TMA's was significant, P=0.036. The translocation score histograms were plotted to compare distributions from the correlation and segmentation methods applied to the same TMA as shown in FIG. 1. Scatter plots for the TMAs show the distribution for normal, invasive ductal carcinoma and metastasis in the lymph nodes (FIGS. 2 and 3). The β-catenin and DAPI images were filtered to reduce the background autofluorescence and remove overlaps at the nucleus boundary for application of the correlation method (FIG. 4). The normal images have a membranous beta-catenin surrounding the epithelial ductal nuclei. Images indicating cancer with high correlation scores show cells that are undifferentiated and membranes that are not well defined. Selected segmented images shown in FIG. 5 demonstrate the different tissue morphologies. The bright field and immunofluorescent images may be registered to provide the pathologist a means of validating the segmentation (FIG. 6).

Heat maps for one or more of the TMAs may be constructed along with a distance map (FIG. 7). In this example, the P=50 tissues were sorted into stages given by histopathology, normal (n=5), stage II (n=13), stage III (n=22) and metastasis in the lymph nodes (n=10). The tissues were clustered with K-means (S=4) to give labels s=[1,4] for each of the 50 tissues. The pattern of labels does not need to be randomly distributed on the four different stages of cancer.

TABLE II

The P values between the clusters for different stages

| | |
|---|---|
| Normal - stage II | P = 0.33 |
| Normal - stage III | P = 0.03 |
| Normal - LN | P = 0.06 |
| Stage II - stage III | P = 0.02 |
| Stage II - LN | P = 0.14 |
| Stage III - LN | P = 0.70 |

Multidimensional K-means segmentation provides more information for scoring cancer stages. By taking mean intensities for N markers in K compartments, the number of features is increased to K times N for clustering. The registration of H&E images provides three more channels of morphological information which may be used to reduce the need for IF morphological markers. Segmentation of multi-spectral images provides dramatic images of the sub-cellular compartments in breast cancer tissue microarrays. The correlation and segmentation scores may be used to separate normal and breast cancer using a single biomarker, β-catenin. The segmentation of ten dimensional images further provides the distribution of five proteins on the same tissue in seven compartments.

Example 2

In this example, β-catenin translocation was again quantified in breast cancer with multiple registered biomarker images in formalin fixed paraffin-embedded breast tissue micro arrays. As further described below, the breast tissue samples (n=445) were filtered and correlated giving scores of −1.7 for normal (n=103), +0.2 for cancer (n=284) and +1.4 for metastasis (n=58). Normal tissue was discriminated against cancer (P=0.0001) and cancer against metastasis (P=0.06).

Seven TMA's were obtained from both Imgenex and Tristar containing paraffin-embedded human breast tissue with both normal and infiltrating ductal carcinoma. The tumor stage, patient age, diagnosis, ER, PR and P53 status were provided for the Imgenex 364 TMA's and the tumor stage and diagnosis were provided for the Imgenex 371 and Tristar TMA's.

The TMA slides were sequentially stained and bleached to increase the number of biomarkers on the same tissue sample in contrast to the conventional practice of using multiple slides. The slides were deparaffinized with Histochoice clearing agent, rehydrated by decreasing EtOH washes, and then antigen retrieved in a citrate buffer (Antigen Unmasking Solution, Vector) by pressure-cooking. For the blocking step, the TMAs were incubated at 37° C. for 45 minutes with 10% donkey serum diluted in 3% bovine serum albumin (BSA). TMAs were then incubated at 37° C. for 45 minutes with rabbit anti beta-catenin (Sigma) primary antibody diluted at 1:1000 in 3% BSA. TMAs were washed in phosphate buffered saline (PBS, pH 7.4) for 3×8 minutes. Primary β-catenin antibody was targeted with cy3 donkey anti rabbit (Jackson Immunoresearch) secondary antibody at 1:250 dilution in 3% BSA for 45 minutes at 37° C. TMAs were washed in PBS, counterstained with 4',6-diamidino-2-phenylindole (DAPI, Sigma) to visualize nuclei, PBS washed and coverslipped using Vector Fluorescence Mounting Medium. Images were acquired using a monochromatic Leica DFC 350 FX monochromatic high-resolution camera on a Leica DMRA2 fluorescent microscope at 20× magnification. The process was repeated with mouse-anti-smooth-muscle-actin-Cy3 and then hematoxylin and eosin (H+E). Sequential staining with the same dye eliminates spectral coupling between different dyes.

Quantifying the distribution of beta-catenin in sub-cellular components generally involves image processing to segment the compartments and measuring protein distributions. The first TMA was stained with beta-catenin and DAPI. In the second TMA, sequentially stained images were registered forming a seven-channel image comprising four fluorescent and three from the bright field H&E images. Other TMA's contained beta-catenin-Cy5, pancadherin-Cy3 and DAPI to measure beta-catenin translocation from the membrane stained with pancadherin to the nucleus stained with DAPI. The images acquired on each tissue were registered automatically and analyzed to score beta-catenin translocation. Image correlation was used to detect overlap of the beta-catenin spatial distribution with the nuclear DAPI image; while, K-means segmentation provided the sub-cellular regions needed to measure the mean concentration ratio of nuclear to membranous β-catenin.

To register the images, after each tissue-staining step, the image pairs A and B are aligned using maximized mutual information. The entropy is related to the pixel intensity probability in each image $P_A$, $P_B$ and joint probability $P_{AB}$. Both translation and a small rotation are applied with a multi-resolution search to find the maximum mutual information. Two unrelated images A and B, with a random pixel relationship between the joint probability and probabilities in each image $P_{AB}=P_A P_B$, will have zero mutual information. Mutual information of two DAPI images is generally very sensitive to slight misalignments. In each step of sequential staining, a DAPI image was acquired for registration.

As noted, correlations between the β-catenin and DAPI images represent β-catenin translocation to the nucleus. In a correlation based embodiment of this example, the translocation score was derived by first filtering the images to reduce background and to separate membranous and nuclear morphology followed by estimating the image correlation. An unsharp image-processing filter was applied comprising the difference between a blurred image and the original in-focus image. This filter enhances edges and reduces the overlap between the membranous beta-catenin and nuclear DAPI image. The amount of blurring was trained using the normal images from a single TMA using a Gaussian blurring kernel, σ=1.8. The amount of blurring in the un-sharp filter was adjusted to give negative correlations for all the normal controls. The same filter parameter was applied to the other six TMA's. The filtered images A and B were correlated to estimate an Rx100 translocation score, which does not depend on the image intensity scale or the addition of a constant background value.

In a segmentation-based embodiment of this example, the four fluorescent biomarker images and registered H&E image were used to identify sub-cellular compartments. DAPI stained the DNA in the nuclei, keratin the epithelial tissue, actin the smooth muscle and β-catenin stained the membrane of normal tissue and translocated to the nuclei in aggressive cancer tissue samples. Registered H+E images on the same tissue provided a blue stain for the nucleus and a red stain for both the epithelial tissue and stroma that generally comprises smooth muscle and connective tissue. The seven channels, four fluorescent dimensions and three bright field dimensions were segmented into four tissue types by the K-means algorithm using the image toolbox ITK. Further morphological mathematic image processing may be used to remove the regions of overlap between the nuclei and membrane regions to obtain a score separating cancer and normal tissues. The ratio of the average value of beta-catenin intensity in the nucleus to that in the membrane provides a segmentation score for translocation.

A two sample T-test at the 95% confidence level was similarly performed to validate the scores generated for both the correlation method and the segmentation method using Minitab software. In the correlation example between beta-catenin and DAPI images, data was acquired on three serial sections of a breast cancer TMA's to increase the sample size. A single TMA was used in the segmentation method that contained four fluorescent and one bright field image.

The correlation coefficient between the beta-catenin and DAPI unsharp filtered images was measured for each sample in the breast normal-cancer-metastasis tissue microarrays giving an Rx100 score as shown in FIG. 8B for clusters corresponding to normal, invasive ductal carcinomas (IDC) and metastasis in the lymph nodes. As shown in FIG. 8A, pixel segmentation into membrane M and nuclei N in β-catenin versus DAPI feature space depends on a Bvalue and a Dvalue. Images with a high translocation score do not have a membranous beta-catenin distribution and have undifferentiated morphology. Using the keratin signal to generate an epithelial mask, the images were segmented into membranous and nuclear regions. A segmentation score was estimated (FIG. 8C) and compared with the correlation score (FIG. 8D) giving a similar trend. An unsharp mask is again preferably used to reduce the correlation of the normal tissue and increased the correlation in cancer by reducing the background autofluorescence and separating the membranes and nuclei. The filter may be used emphasize the spots of β-catenin that are inside the nuclei.

As shown in FIGS. 9A and 9B, selected regions show a normal duct after unsharp filtering and an high correlation score image showing translocation to the nuclei. Profiles of the filtered intensities may be anti correlated for normal tissue (FIG. 9C) and correlated for translocation in cancer (FIG. 9D). The unfiltered β-catenin duct image shows the membranous morphology (FIG. 9E) with auto-fluorescence and the registered DAPI image shows the nuclei (FIG. 9F). As shown in FIGS. 9G and 9H, there is considerable overlap in an unfiltered RGB image between the crowded nuclei and membrane.

As shown in FIG. 10, various image pairs were segmented to yield the membranous region, the nucleus and the cytosol. The membrane is a ridge segmented using a curvature step. Image pair A-B illustrates normal breast tissue having ducts with a ring of crowded nuclei. Image pair C-D illustrates infiltrating duct carcinoma. Image pair E-F illustrates undifferentiated morphology indicating a poor histopathic prognosis.

The results of the two-sample T-test are summarized in Table III.

TABLE III

A comparison between the translocation scores computed with the segmentation and correlation methods for a breast tissue microarray using the biomarkers beta-catenin, keratin and DAPI. Two sample T test

| Patients | N | Seg Mean | Stdev | Corr Mean | Stdev |
|---|---|---|---|---|---|
| Normal | 9 | 0.206 | 0.0384 | −4.83 | 3.29 |
| Cancer | 38 | 0.2406 | 0.0571 | −0.65 | 5.23 |
| Metastasis | 8 | 0.3216 | 0.0481 | 0.23 | 4.57 |
| | | P | | P | |
| Norm vs Ca | | 0.042 | | 0.007 | |
| Norm vs Met | | 0.0001 | | 0.024 | |
| Ca vs Met | | 0.0015 | | 0.64 | |

Details of the scores on the TMA's are tabulated and shown in Table IV.

TABLE IV

Three serial section breast tissue microarrays with age, diagnosis, stage, ER, PR, p53 and beta-catenin translocation scores with both the correlation and segmentation methods

| No. | Age | Diagnosis pTNM | | Stage | LN* | ER** | PR** | p53 | Rx100 Score Breast 1 | Rx100 score Breast 2 | Rx100 score Breast 3 | Segment score Breast 2 |
|---|---|---|---|---|---|---|---|---|---|---|---|---|
| 1 | 28 | IDC | T4cN3cMx | IIIC | uk | + | − | − | | 0.3 | −7.9 | 0.2229 |
| 2 | 71 | SPC | T3N1aM0 | IIIA | 2/12 | + | + | − | 0.02 | −1.3 | 11.3 | 0.2563 |
| 3 | 26 | IDC | T4bN3aM0 | IIIC | 22/25 | + | − | − | −0.55 | −0.2 | −6.2 | 0.2131 |
| 4 | 43 | IDC | T4bN2aM0 | IIIB | 4/13 | + | + | − | 0.6 | −5.3 | −0.9 | 0.2868 |
| 5 | 39 | IDC | T3N0M0 | IIB | 0/37 | − | − | + | 2.59 | −4.2 | −9.8 | 0.2005 |
| 6 | 46 | IDC | T3N3aM0 | IIIC | 14/15 | + | + | − | −4.5 | 1.9 | −5.2 | 0.2100 |
| 7 | 47 | IDC | T2N3aM0 | IIIC | 37/41 | − | − | + | 2.7 | 1 | −3.5 | 0.2508 |
| 8 | 67 | IDC | T3N1aM0 | IIIA | 1/12 | + | + | − | 1.1 | −3.9 | 2.0 | 0.2577 |
| 9 | 33 | IDC | T3N3aM0 | IIIC | 25/25 | + | + | − | 0.8 | 1 | −2.0 | 0.2658 |
| 10 | 47 | IDC | T2N0M0 | IIA | 0/15 | + | + | − | 7.4 | 1.1 | −8.1 | 0.2831 |
| 11 | 49 | IDC | T2N1aM0 | IIB | 1/14 | − | − | − | 15.4 | 10.2 | −0.3 | 0.1508 |
| 12 | 46 | IDC | T3N1aM0 | IIIA | 2/25 | + | − | − | 10.6 | 1.1 | 3.6 | 0.2303 |
| 13 | 39 | IDC | T2N1aM0 | IIB | 2/19 | + | uk | − | 6.3 | 0.2 | 8.2 | 0.2578 |
| 14 | 43 | IDC | T3N3aM0 | IIIC | 25/25 | − | − | − | 3.7 | −2.0 | −3.2 | 0.2498 |
| 15 | 54 | ILC | T3N3aM0 | IIIC | 28/31 | + | − | + | 0.6 | −6.4 | 5.8 | 0.1876 |
| 16 | 58 | IDC | T4bN1aM0 | IIIB | 1/15 | − | − | − | 7.4 | −4.1 | −8.7 | 0.2596 |
| 17 | 37 | IDC | T2N1aM0 | IIB | 2/14 | + | + | + | 3.9 | 0.2 | −5.8 | 0.1726 |
| 18 | 43 | IDC | T2N0M0 | IIA | 0/13 | − | − | + | 3.5 | −13.1 | 1.2 | 0.2682 |
| 19 | 51 | DCIS | TisN0M0 | 0 | 0/20 | + | + | − | −5.7 | 1.5 | 0.6 | 0.3833 |
| 20 | 80 | MC | T3N2aM0 | IIIA | 4/28 | − | − | + | 9.5 | 4.1 | −8.4 | 0.1891 |
| 21 | 36 | IDC | T2N2aM0 | IIIA | 7/24 | − | − | − | 1..3 | −0.3 | 12.4 | 0.2081 |
| 22 | 59 | IDC | T2N3bM0 | IIIC | 16/25 | + | + | − | 5..6 | 1.6 | −0.9 | 0.2181 |
| 23 | 34 | DCIS | TisN0M0 | 0 | 0/5 | − | − | + | 3..5 | 4.9 | 7.5 | 0.1969 |
| 24 | 54 | IDC | T2N2aM0 | IIIA | 8/8 | + | + | + | 7.3 | −1.5 | 2.1 | 0.2569 |
| 25 | 47 | IDC | T2N0M0 | IIA | 0/22 | + | + | − | 1.7 | 7.1 | 4.5 | 0.2568 |
| 26 | 53 | IDC | T2N0M0 | IIA | 0/12 | − | − | + | 3..2 | 2.4 | −0.6 | 0.1531 |
| 27 | 59 | IDC | T2N1aM0 | IIA | 3/24 | + | − | − | 0.6 | −5.3 | 6.2 | 0.1653 |
| 28 | 60 | SRCC | T3N0M0 | IIB | 0/7 | + | + | − | 0.4 | 9.9 | 1.3 | 0.3289 |
| 29 | 37 | IDC | T3N2aM0 | IIIA | 7/21 | − | + | + | 13 | 4.7 | −7.0 | 0.2977 |
| 30 | 46 | IDC | T2N0M0 | IIA | 0/17 | + | − | − | 3.7 | 8.0 | 5.1 | 0.4059 |
| 31 | 35 | IDC | T3N2aM0 | IIIA | 8/14 | + | − | − | −.06 | −5.5 | 6.1 | 0.2062 |
| 32 | 47 | IDC | T2N0M0 | IIA | 0/26 | − | − | + | −5.7 | 15.6 | −7.2 | 0.3295 |
| 33 | 54 | IDC | T2N0M0 | IIA | 0/17 | + | + | − | 4.2 | 3.6 | −6.8 | 0.2094 |
| 34 | 47 | IDC | T2N2aM0 | IIIA | 8/17 | − | − | + | 4.8 | 20.1 | 10.0 | 0.1717 |
| 35 | 41 | IDC | T3N0M0 | IIB | 0/6 | + | + | − | 3.2 | 17.9 | −0.13 | 0.2154 |
| 36 | 38 | IDC | T3N1aM0 | IIIA | 2/6 | − | − | + | 9.6 | 7.9 | 6.4 | 0.2188 |
| 37 | 55 | IDC | T2N1aM0 | IIB | 3/21 | − | − | + | 4.2 | −2.4 | 2.5 | 0.2047 |
| 38 | 65 | IDC | T2N0M0 | IIA | 0/9 | + | − | − | −2.9 | 7.4 | 4.4 | 0.2672 |
| 39 | 66 | IDC | T3N2aM0 | IIIA | 5/14 | − | − | − | 8.9 | 10.9 | −7.77 | 0.2759 |
| 40 | 44 | IDC | T3N1aM0 | IIIA | 1/12 | + | − | + | 6.3 | 5.4 | −0.68 | 0.3566 |
| 41 | 52 | MCLN | T3N3aM0 | IIIC | 10/22 | − | − | + | 0.9 | −0.1 | −1.4 | 0.2287 |
| 42 | 32 | MCLN | T3N3aM0 | IIIC | 20/23 | + | + | − | 8.6 | 3.6 | 12.19 | 0.2903 |
| 43 | 58 | MCLN | T3N3aM0 | IIIC | 22/22 | + | + | + | 2.1 | 0.3 | 2.16 | 0.3467 |
| 44 | 52 | MCLN | T3N3M0 | IIIC | 24/24 | − | − | − | −1.6 | −7.6 | 4.09 | 0.3565 |
| 45 | 58 | MCLN | T3N2aM0 | IIIA | 4/20 | − | − | + | x | x | −2.2 | |
| 46 | 38 | MCLN | T1cN1aM0 | IIA | 1/8 | + | + | − | 1.5 | −1.6 | 4.28 | 0.2859 |
| 47 | 45 | MCLN | T1cN2aM0 | IIIA | 9/23 | − | − | − | 11.1 | 8.7 | 1.36 | 0.3463 |
| 48 | 45 | MCLN | T2N3aM0 | IIIC | 11/20 | + | + | − | 2..9 | −0.9 | 5.00 | 0.3625 |
| 49 | 29 | MCLN | T2N2aM0 | IIIA | 8/10 | − | − | + | 5..3 | 5.5 | −9.15 | 0.2312 |
| 50 | 61 | MCLN | T1bN3aM0 | IIIC | 22/26 | − | − | − | x | x | 28.95 | |
| 51 | 46 | normal, nipple... | | | | | | | −2.5 | −7.1 | 6.289 | 0.1570 |
| 52 | 47 | normal, nipple... | | | | | | | 1 | −0.5 | −3.07 | 0.1785 |
| 53 | 40 | normal,... | | | | | | | −2.1 | −3.7 | −2.06 | 0.2281 |
| 54 | 43 | normal,... | | | | | | | −1.1 | −3.0 | 0.101 | 0.1767 |
| 55 | 40 | normal,... | | | | | | | −1.6 | −5.0 | −10.54 | 0.170632 |
| 56 | 40 | Normal,... | | | | | | | −6.9 | −11.3 | −15.32 | 0.2241 |
| 57 | 45 | Normal,... | | | | | | | 2.48 | −3.8 | 2.451 | 0.2101 |
| 58 | 44 | Normal,... | | | | | | | 2.18 | −1.2 | −6.81 | 0.2770 |

TABLE IV-continued

Three serial section breast tissue microarrays with age, diagnosis, stage, ER, PR, p53 and beta-catenin translocation scores with both the correlation and segmentation methods

| No. | Age | Diagnosis pTNM | Stage | LN* | ER** | PR** | p53 | Rx100 Score Breast 1 | Rx100 score Breast 2 | Rx100 score Breast 3 | Segment score Breast 2 |
|---|---|---|---|---|---|---|---|---|---|---|---|
| 59 | 37 | Normal, . . . | | | | | | 0 | −2.1 | 7.187 | |
| 60 | 51 | Normal, . . . | | | | | | | | −4.51 | |

11175 Flintkote Ave., Suite E, San Diego, CA 92121 Tel: (858) 642-0978 Fax (858)642-0937 Toll free: 1-888-723-GENE
TNM and stage: AJCC Cancer Staging Manual (6th Edition)
51-60: Non-neoplastic breast tissue in breast cancer patients.
*LN, positive lymph nodes/examined lymph nodes, uk: unknown
**ER, estrogen receptor: PR, progesteron receptor
IDC, infiltrating duct carcinoma;
SPC, solid papillary carcinoma:
ILC, infiltrating lobular carcinoma
SRCC, signet ring cell carcinoma;
DCIS, ductal carcinoma in situ
MCLN, metastatic carcinoma in lymph node:
MC, medullary carcinoma In this example, correlation scores were measured in three tissue arrays using only the beta-catenin and DAPI image channels. The accuracy of segmentation improves with the number of registered biomarker images and H&E. Sequentially stained registered images provide multiple markers that may be combined with conventional H+E. As noted, images may be segmented to define the membrane and nucleus. A segmentation score, which in this example was estimated by the ratio of mean beta-catenin intensity in the nuclear to membranous regions, may provide different distributions for cancer vs. normal controls. For example, the three dimensional segmentation (P=0.046) improves by using seven-dimensional segmentation on the same TMA (p=0.0039). As is further shown in FIG. 11, the membranous β-catenin morphology for normal ducts (A) differs from infiltrating ductal carcinomas (B) illustrated in registered H+E images of the same tissue (C-D). FIG. 11 illustrates an example in which ridges are assumed to have one negative and one zero principle curvature. For the example illustrated in FIG. 11, a filter is used to smooth the β-catenin image, estimate the pixels based on the desired curvatures, and close the breaks in the cell boundaries.

The methods and systems of the invention may be used to personalized therapy and enhance cancer drug development. Markers used in clinical practice today such as, but not limited to, Her2, ER, PR, P53, the membrane marker E-cadherins, and the nuclear marker DAPI may be optimally imaged with IF. Sequential staining and IF image segmentation scoring provides a means to analyze multiple biomarkers in the same tissue in contrast to IHC that requires a tissue section for each antigen.

The automated system 10 (FIG. 12) for carrying out the methods generally comprises: a storage device 12 for at least temporarily storing one or more images of one or more cells, wherein the images comprise a plurality of channels; and a processor 14 comprising, a means for determining an extent to which a biomarker may have translocated from at least one subcellular region to another subcellular region; and a means for generating a score corresponding to the extent of translocation. The score may indicate whether the tissue is cancerous and/or whether the cancerous tissue is metastasizing. The system may be adapted to determine scores directed at translocation that indicates the presence of cancer. The system may be further adapted to determine translocation indicative of a specific group of cancers such as epithelial cancers consisting of breast cancer, colon cancer and melanoma. However, the system is not necessarily limited to epithelial cancers or to specific types of epithelial cancers. The channels preferably comprise at least one biomarker and one morphological stain.

The means for determining the extent to which the biomarker has translocated may determine the translocation at least in part using one or more appropriate correlation steps of the methods described. For example, the system may use as a correlation between at least one image comprising a biomarker channel and at least one image comprising a morphological channel, and a ratio of average intensity of the biomarker in a membrane subcellular region and another subcellular region. The sub cellular regions may comprise any cellular component or region such as but not limited to the membrane, cytoplasm, and nucleus. The means for determining may apply an high pass unsharp mask filter to the image comprising the biomarker channel and the image comprising the morphological channel.

Either means for determining the extent of the translocation may comprise one or more processing mechanisms such as one or more algorithms residing in a memory device associated with the processor or a sub processor, or an external processor that is capable of communicating with the processor.

The mean for determining the extent to which the biomarker has translocated may also or alternatively determine the translocation at least in part using one or more appropriate segmentation steps of the methods described. For example, the system may segment at least one image comprising a biomarker channel and at least one image comprising a morphological channel into subcellular regions, and determine a ratio of average intensity of the biomarker in a membrane subcellular region and another subcellular region. As a further example, the means for determining may segment the images in part by: estimating one or more K initial cluster centers $\bar{x}(k)$; labeling one or more N-dimensional voxel vectors x with a closest cluster center $L(x, y) = \arg \min \|x - \bar{x}(k)\|$; and updating the cluster centers $\bar{x}(k)$ using one or more label masks until one or more cluster centers vectors remain constant.

The storage device may comprise, but is not necessarily limited to, any suitable hard drive memory associated with the processor such as the ROM (read only memory), RAM (random access memory) or DRAM (dynamic random access memory) of a CPU (central processing unit), or any suitable disk drive memory device such as a DVD or CD, or a zip drive or memory card. The storage device may be remotely located from the processor or the means for displaying the images, and yet still be accessed through any suitable connection device or communications network including but not limited to local area networks, cable networks, satellite networks, and the Internet, regardless whether hard wired or wireless. The processor or CPU may comprise a microprocessor, microcontroller and a digital signal processor (DSP).

The storage device 12 and processor 14 may be incorporated as components of an analytical device such as an automated high-speed system that images and analyzes TMAs in one system. System 10 may further comprise a means for displaying 16 one or more of the images; an interactive viewer 18; a virtual microscope 20; and/or a means for transmitting 22 one or more of the images or any related data or analytical information over a communications network 24 to one or more remote locations 26.

The means for displaying 16 may comprise any suitable device capable of displaying a digital image such as, but not limited to, devices that incorporate an LCD or CRT. The means for transmitting 22 may comprise any suitable means for transmitting digital information over a communications network including but not limited to hardwired or wireless digital communications systems. The system may further comprise an automated device 28 for applying one or more of the stains and a digital imaging device 30 such as, but not limited to, an imaging microscope comprising an excitation source 32 and capable of capturing digital images of the TMAs. Such imaging devices are preferably capable of auto focusing and then maintaining and tracking the focus feature as needed throughout processing.

These multi-channel methods are not limited to morphological stains or fluorescent biomarkers or even to pathology. Any stain that enables some informative aspect or feature of a biological sample to be visualized so that it can be digitally imaged and processed would be suitable for these methods. Suitable stains include, but are not necessarily limited to, cytological or morphological stains, immunological stains such as immunohisto- and immunocyto-chemistry stains, cytogenetical stains, in situ hybridization stains, cytochemical stains, DNA and chromosome markers, and substrate binding assay stains. Other medical and bioscience applications can benefit from the extended multi-channels. These multi-channel methods provide a flexible framework in which markers can be imaged sequentially without being limited to optical, chemical, and biological interactions.

As noted, the methods and systems are suitable for any number of applications including, but not limited to, detecting and analyzing epithelial cancers such as, but not limited to, breast, colon and prostate cancers and melanoma.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for analyzing tissue samples, comprising,
a storage device for at least temporarily storing one or more images of one or more cells in one or more of the tissue samples, wherein said images comprise a plurality of channels;
a processor that quantifies a distribution of a biomarker in a plurality of subcellular regions to quantify translocation of the biomarker from at least one subcellular region to another subcellular region, at least in part by using a correlation between at least one image comprising a biomarker channel and at least one image comprising a morphological channel and a ratio of intensity of said biomarker in a membrane subcellular region and another subcellular region; and
a score corresponding to the quantified translocation; and
a display device for displaying one or more of the images, the score, or both, wherein the ratio of intensity is an average intensity of said biomarker in a membrane subcellular region and another subcellular region and, wherein said correlation is r and, $$r = \frac{\sum_i (A_i - \overline{A})(B_i - \overline{B})}{\sqrt{\sum_i |A_i - \overline{A}|^2 \sum_i |B_i - \overline{B}|^2}}.$$

wherein $A_i$ is an intensity of a pixel on the image comprising the biomarker channel, $\overline{A}$ is an average of the intensity of all the pixels on the image comprising the biomarker channel, $B_i$ is an intensity of a pixel on the image comprising the morphological channel, $\overline{B}$ is an average of the intensity of all the pixels on the image comprising the morphological channel.

2. The system of claim 1, wherein the extent of translocation is determined in part by applying a high pass unsharp mask filter to said image comprising said biomarker channel and said image comprising said morphological channel.

3. The system of claim 1, wherein said score indicates whether said tissue is cancerous.

4. The system of claim 3, wherein said score indicates whether said cancerous tissue is metastasizing.

5. The system of claim 3, wherein said tissue comprises an epithelial cancer.

6. The system of claim 5, wherein said epithelial cancer is from a group consisting of breast cancer, colon cancer and melanoma.

7. A system for analyzing tissue samples, comprising,
a storage device for at least temporarily storing one or more images of one or more cells in one or more of the tissue samples, wherein said images comprise a plurality of channels;
a processor that quantifies a distribution of a biomarker in a plurality of subcellular regions to quantify translocation of the biomarker from at least one subcellular region to another subcellular region, at least in part by using a correlation between at least one image comprising a biomarker channel and at least one image comprising a morphological channel and a ratio of intensity of said biomarker in a membrane subcellular region and another subcellular region; and a score corresponding to the quantified translocation; and a display device for displaying one or more of the images, the score, or both, wherein the translocation is determined at least in part by segmenting at least one image comprising a biomarker channel and at least one image comprising a morphological channel into subcellular regions, and determining a ratio of average intensity of said biomarker in a membrane subcellular region and another subcellular region, and wherein the images are segmented by, estimating one or more K initial cluster centers $\bar{x}(k)$,
wherein K is the number of clusters in an image and a cluster
center $\bar{x}(k)$ is the average of all pixels in that cluster;

labeling one or more N-dimensional voxel vectors x with a closest cluster center $L(x, y) = \arg\min \|x - \bar{x}(k)\|$, wherein L is the label for a given pixel location defined by an x axis and y axis, and x is an attribute vector; and updating said cluster centers $\bar{x}(k)$ using one or more label masks until one or more cluster centers vectors remain constant.

8. The system of claim 7, wherein said score indicates whether said tissue is cancerous.

9. The system of claim 8, wherein said score indicates whether said cancerous tissue is metastasizing.

* * * * *